United States Patent [19]

Weber et al.

[11] Patent Number: 5,484,561
[45] Date of Patent: Jan. 16, 1996

[54] METHOD OF MAKING A UNITARY INFLATABLE RESTRAINT CONTAINER

[75] Inventors: John C. Weber, Springboro; Bobby Edwards, Dayton, both of Ohio

[73] Assignee: General Motors Corporation, Detroit, Mich.

[21] Appl. No.: 260,618

[22] Filed: Jun. 16, 1994

Related U.S. Application Data

[63] Continuation of Ser. No. 897,114, Jun. 11, 1992, abandoned.

[51] Int. Cl.[6] .......................... B29C 44/06; B29C 44/12
[52] U.S. Cl. .................. 264/46.4; 264/46.6; 264/278
[58] Field of Search ..................... 264/46.4, 46.6, 264/255, 278

[56] References Cited

U.S. PATENT DOCUMENTS

| | | | |
|---|---|---|---|
| 3,844,527 | 10/1974 | Scott . | |
| 4,148,503 | 4/1979 | Shiratori et al. | 280/731 |
| 4,224,375 | 9/1980 | Veiga | 428/315 |
| 4,246,213 | 1/1981 | Takamatsu et al. | 264/46.6 |
| 4,334,699 | 6/1982 | Patzelt et al. | 280/731 |
| 4,548,919 | 10/1985 | Megma | 521/51 |
| 4,590,219 | 5/1986 | Nissen et al. | 521/51 |
| 4,852,907 | 8/1989 | Shiraki et al. | 280/731 |
| 4,952,351 | 8/1990 | Parker et al. | 264/464 |
| 4,964,653 | 10/1990 | Parker | 280/732 |
| 5,002,307 | 3/1991 | Heidorn | 264/259 |
| 5,013,064 | 5/1991 | Miller et al. | 280/730 |
| 5,025,039 | 6/1991 | Neuhaus et al. | 521/51 |
| 5,131,678 | 7/1992 | Gardner et al. | 264/46.5 |
| 5,149,479 | 9/1992 | Nakajima | 264/293 |
| 5,183,615 | 2/1993 | Zushi | 264/259 |
| 5,316,822 | 5/1994 | Nishijima et al. | 264/46.4 |
| 5,334,340 | 8/1994 | Zushi | 264/161 |
| 5,344,183 | 9/1994 | Hersman et al. | 264/46.5 |

FOREIGN PATENT DOCUMENTS 2228235  8/1990  United Kingdom .

*Primary Examiner*—Allan R. Kuhns
*Attorney, Agent, or Firm*—Charles E. Leahy; Kathryn A. Marra

[57] ABSTRACT

A vehicle air bag installation comprises an air bag mounted in a unitary container comprising a molded plastic substrate having an I-shaped slot defining a pair of doors with integral hinges, and a continuous self-skinned polyurethane foam covering adhered thereto during the formation of the covering. The covering has predetermined weakened sections formed along a tear line defined by the slot which rupture during air bag deployment to facilitate door opening. The covering material is an aliphatic or aromatic isocyanate cured low density polyurethane foam having a durometer of 35–60 Shore A. The unitary container is formed by providing a molded plastic container substrate having slots defining the doors, placing the substrate in a mold having a cover, placing a core within the mold to support the substrate. The core has a plurality of upstanding spaced blades projecting into the slots into spaced relation to the mold cover. Urethane foam is injected into the mold and the cover is closed. The foam is cured to form a container cover integral with the substrate and having a notched tear line along the slot.

3 Claims, 4 Drawing Sheets

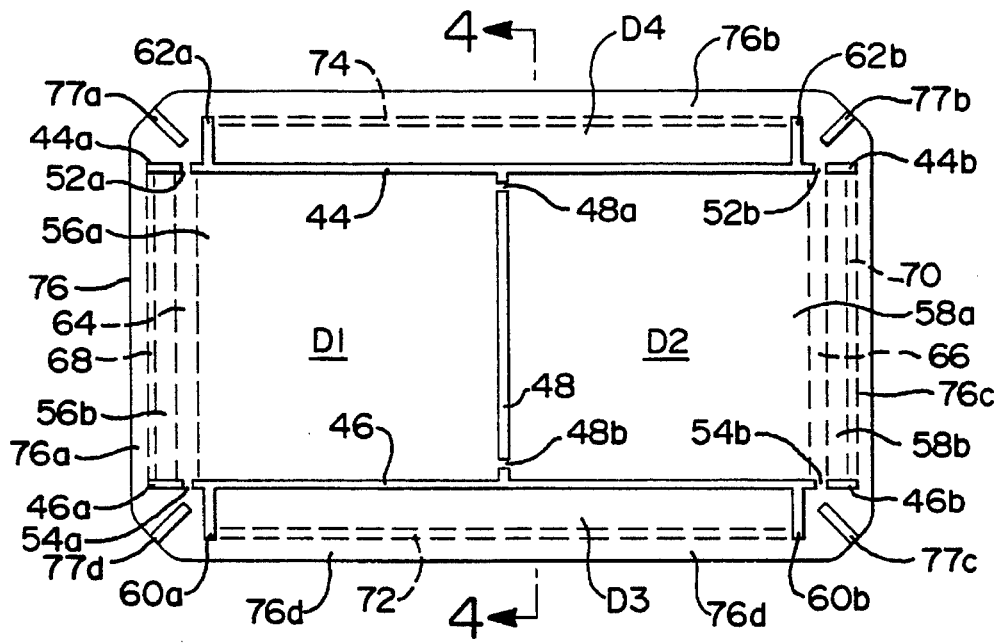
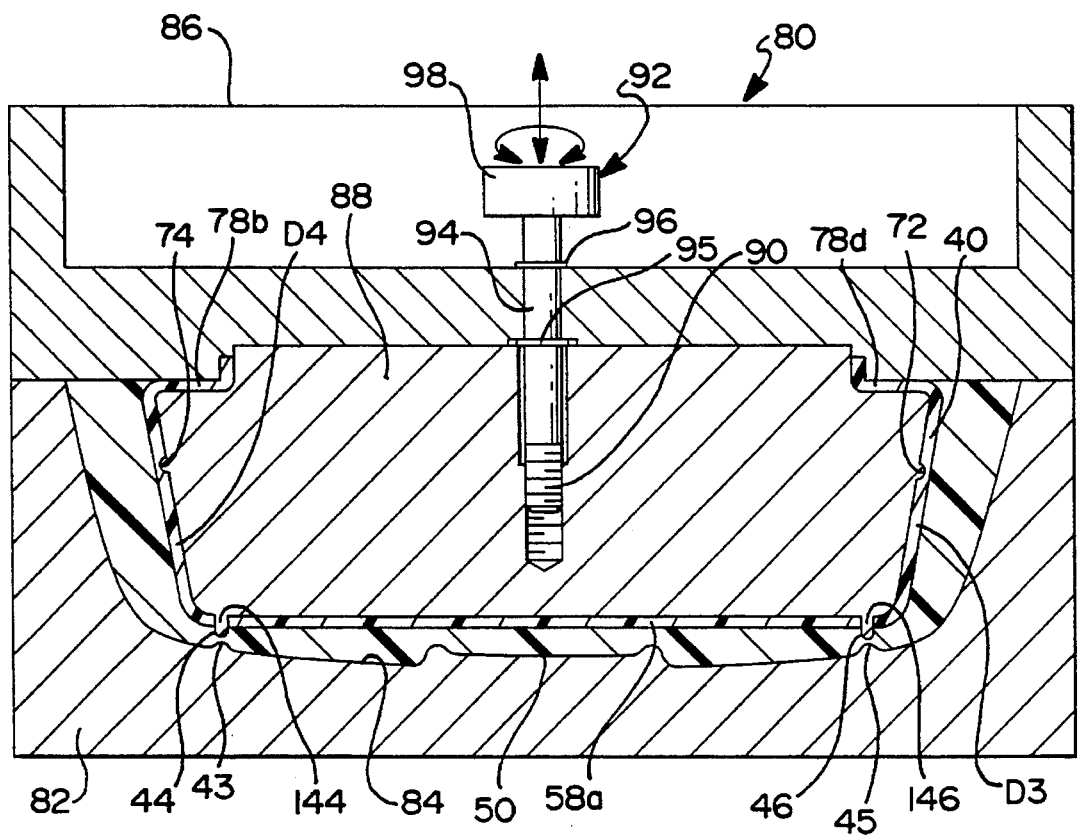

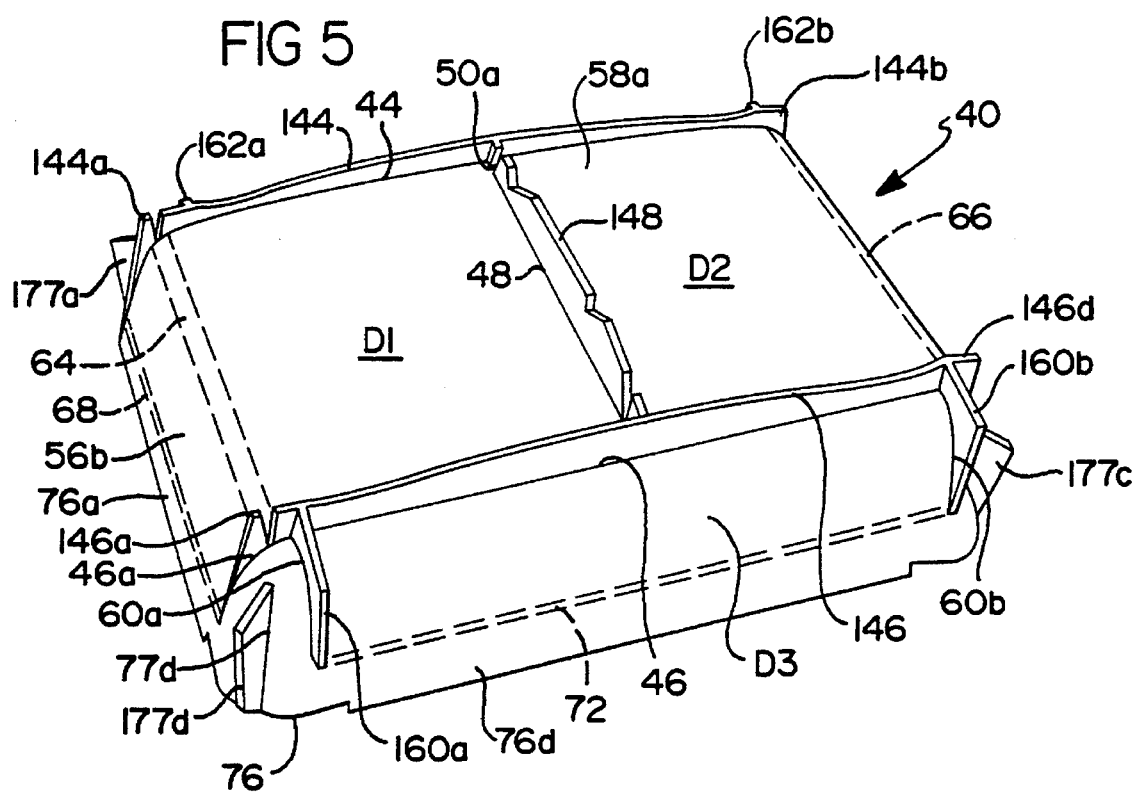
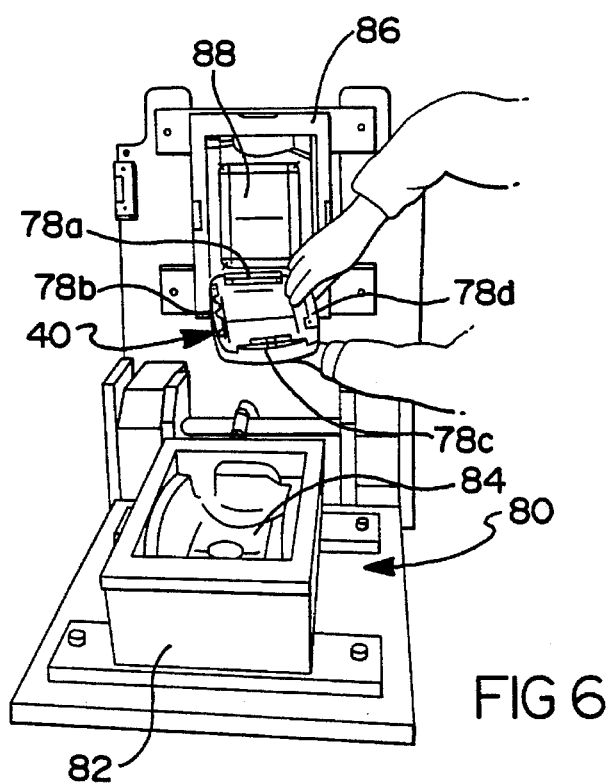

5,484,561

METHOD OF MAKING A UNITARY INFLATABLE RESTRAINT CONTAINER

This is a continuation of application Ser. No. 07/897,114 filed on Jun. 11, 1992, now abandoned.

BACKGROUND OF THE INVENTION

This invention relates generally to containers for covering an inflatable restraint installation in a vehicle recess and, more particularly, to a container of unitary construction and to the method of manufacturing such a container.

Conventionally, the inflatable restraint, or air bag, provided for a vehicle driver is mounted in a receptacle located in the vehicle steering wheel assembly. It is conventional for the steering wheel hub to mount a container cover which incorporates a door formed in a decorative panel. This door is normally rectangular and is separable or separate from the surrounding panel area so that it can be swung open by the deploying air bag upon inflation.

Some of these cover doors comprise a three-sided cutout portion of the panel substrate covered by a foam padding and a decorative outer skin. The foam and skin include a tear seam line of weakened material along three sides of the door. This tear seam is fractured by the inflating air bag so that the door swings open about its fourth side, which functions as a hinge, to enable the cushion to properly deploy.

It is desirable for the outer skin or covering of the cover door match the material of the steering wheel for cosmetic conformity. Currently two methods of construction are used to make these cover doors. In one, a two-piece construction, a molded urethane covering, which matches the usual urethane steering wheel, is attached to a structural substrate, which includes a door swingable about a weakened hinge section.

In the other, a reinforcing mesh, or scrim, is molded into a urethane cover, and no substrate is used. Both constructions incorporate weakened sections in the urethane defining predetermined tear lines to create doors which tear open upon cushion deployment.

In the two-piece construction, each of the substrate and covering are separately made and thereafter assembled. The unitary construction eliminates one of the forming operations, plus the assembly operation. However, it has been found that it is difficult to assure that the reinforcing mesh is always properly located in the urethane cover, since it tends to "float" during the molding process. Also, a substantial layer of urethane and a substantial amount of reinforcing mesh must be used to prevent "sag" of the cover at elevated temperatures and to resist deformation upon incidental contact by the vehicle occupants.

A combination of both of these constructions is illustrated in U.S. Pat. No. 4,852,907 in which a partial structural substrate is embedded in a urethane covering. The substrate includes integral hinges, and the doors defined by predetermined tear lines in the urethane cover are reinforced by a nylon mesh. This construction suffers from the same floating mesh manufacturing problem described above and requires a complex molding operation to wed the substrate, the urethane and the mesh.

It is desirable to develop an inflatable restraint container construction which has a simplified construction which facilitates its manufacture.

SUMMARY OF THE INVENTION

Accordingly, it is an object of this invention to provide an inflatable restraint container having a simplified construction which facilitates its manufacture.

In one aspect, this invention features a unitary container for an air bag installed in a vehicle comprising a molded plastic substrate having a slot defining a door with an integral hinge. A continuous self-skinned foam covering is adhered to the substrate during the formation of the covering and has predetermined weakened sections formed along a tear line defined by the slot.

Preferably, the covering material is an aliphatic or aromatic isocyanate cured low density polyurethane foam having a durometer of 35–60 Shore A.

In another aspect, this invention features a method of manufacturing unitary container for an air bag comprising the steps of a. providing a molded plastic container substrate having a slot defining a door, b. providing a mold having a cover and a core mounted on the cover, the core having a plurality of upstanding spaced blades, c. placing the substrate over the core with the upstanding spaced blades projecting into the slot into spaced relation to the mold cover, d. injecting a urethane foam into the mold, and e. closing the mold cover and curing the foam to form a container cover integral with the substrate and having a notched tear line along said slot.

Preferably, the substrate is coated with a dilute solution of acidic polymer prior to foam injection, and the substrate and mold cover are sufficiently spaced to enable foaming of the urethane.

In a further aspect, this invention features a steering wheel having a central hub, an air bag, an air bag container mounted on the hub comprising a molded plastic substrate having a slot defining a door with an integral hinge, and a continuous self-skinned urethane foam covering adhered thereto during the formation of the covering and having predetermined weakened sections formed along a tear line defined by the slot.

Preferably, the steering wheel and the container are both made of polyurethane.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 3 is a plan view of the container substrate;

FIG. 4 is an enlarged transverse sectional view, taken along line 4—4 of FIG. 3, illustrating the substrate as placed in a mold during formation and adhesion of the covering to form the unitary air bag container according to this invention;

FIG. 5 is a perspective view of the container substrate with the molding core attached just prior to placement in the mold; and FIGS. 6–9 are perspective views of a mold for forming and adhering a covering to a substrate to form the unitary air bag container according to this invention, illustrating the sequence of operation of the mold.

DETAILED DESCRIPTION OF A PREFERRED EMBODIMENT

Figure 1:
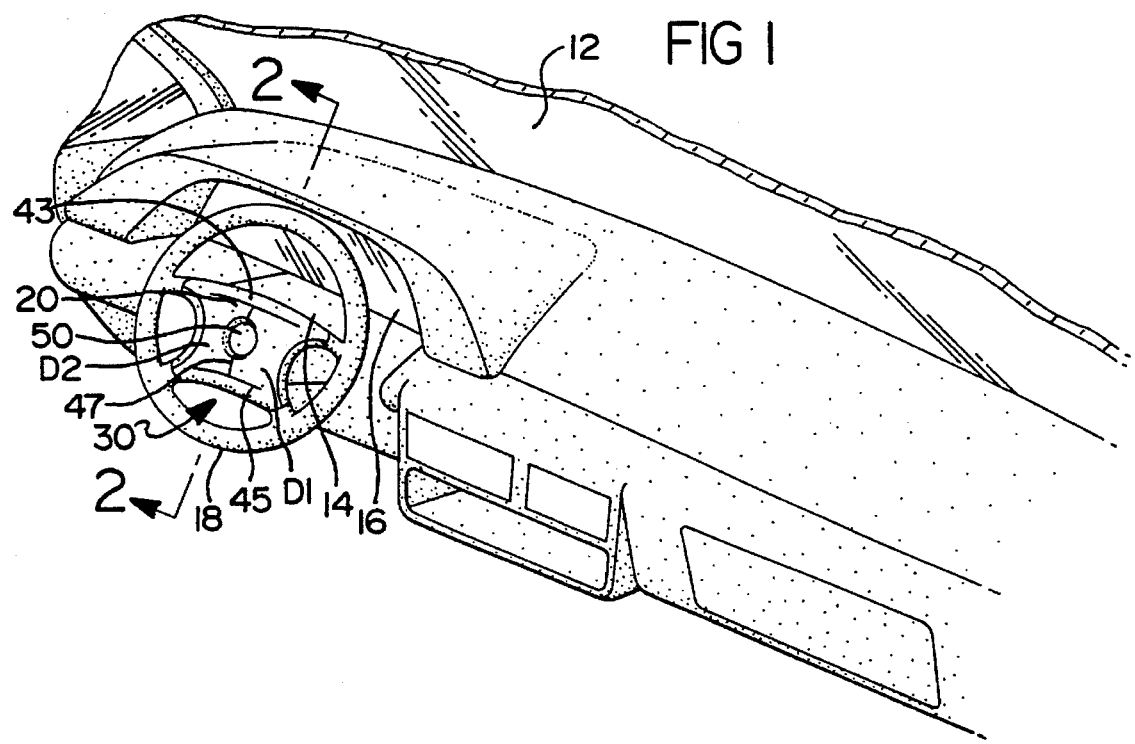
FIG. 1 is a partial perspective view of a vehicle instrument panel and a steering wheel having a decorative container for concealing an inflatable air bag, the container comprising a plastic substrate and an integral covering formed in accordance with this invention.

Referring now to FIG. 1 of the drawings, a passenger vehicle interior includes an instrument panel 10 mounted behind a windshield 12. Instrument panel 10 includes a shroud 14 which covers an instrument cluster 16 in front of the left, or driver's, position in the vehicle. A steering wheel 18 projects from instrument panel 10 and includes a hub portion 20.

Figure 2:
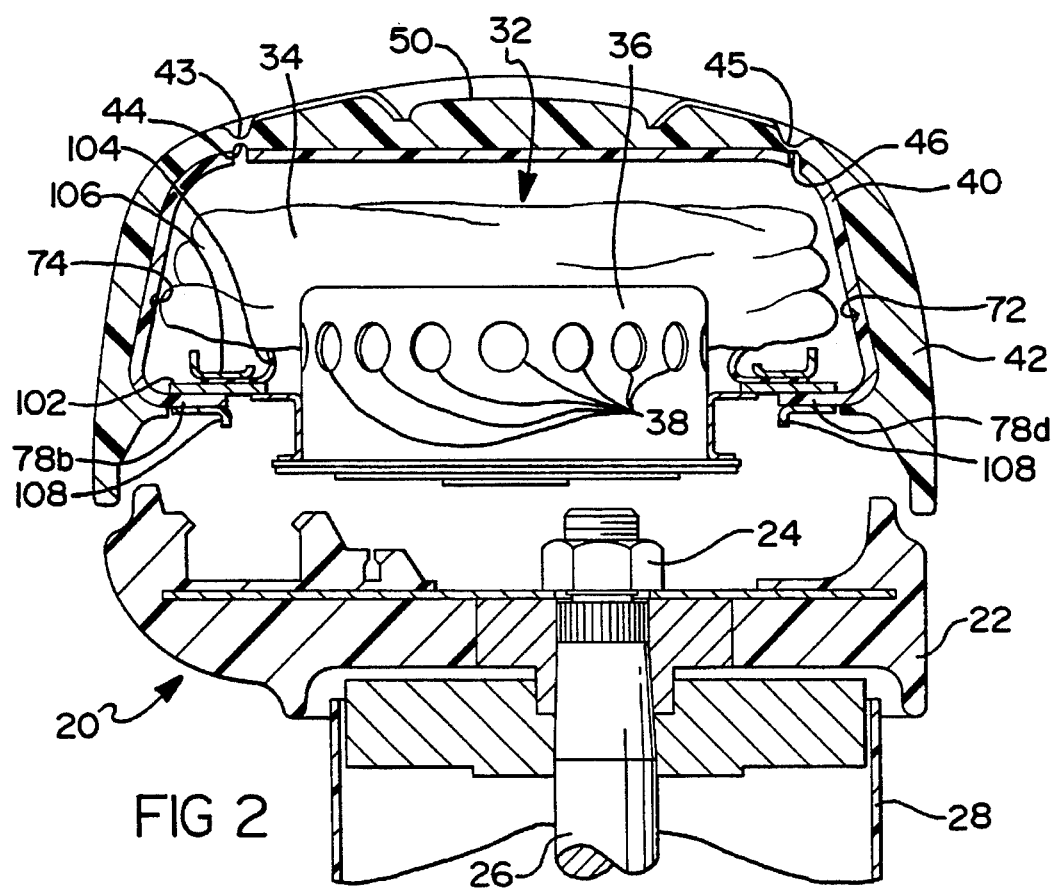
FIG. 2 is an enlarged sectional view of the container, taken along line 2—2 of FIG. 1.

As shown in FIG. 2, steering wheel hub 20 includes a base 22 that is secured by a bolt 24 to a steering shaft 26 which is shrouded by a steering column 28. Hub 20 further includes a container 30 which covers an air bag assembly 32. The air bag assembly includes an inflatable air bag 34 which is folded atop a circular inflator 36 that has spaced gas discharge holes 38 that communicate with the interior of air bag 34.

Container 30 is a unitary member comprising a resilient thermoplastic substrate 40 having a urethane foam covering 42. As shown in FIGS. 1 and 2, foam covering has a superficial design in an "I" pattern, comprising surface grooves forming leg segments 43 and 45, and a cross bar 47 having a central circle 50. These grooves and corresponding underlying subsurface grooves 44, 46 and 48 (described later) provide tear lines which define door segments D1 and D2 that are forcibly opened by deployment of the air bag 34 upon inflation by inflator 36 in a well-known manner.

Referring now to FIG. 3, container substrate 40 has a generally rectangular cup shape and is formed of a single piece of injection molded thermoplastic material. Container 40 is formed with a series of slots which define doors. Main doors D1 and D2 are bounded on their sides by elongated grooves 44 and 46 and are separated by a cross groove 48. Groove 48 is slightly spaced from short inward legs of grooves 414 and 46 by integral tabs 48a and 48b which connect doors D1 and D2.

At their ends, grooves 44 and 46 are interrupted by respective integral tabs 52a, 52b and 54a, 54b forming groove end segments 44a, 44b and 46a, 46b. Thus, door D1 comprises a horizontal portion 56a, bounded by grooves 44 and 46 and an inclined extension 56b, bounded by groove end segments 44a and 46a, formed in one end of container 40. Similarly, door D2 comprises a horizontal portion 58a, bounded by grooves 44 and 46 and an inclined extension 58b, bounded by groove end segments 44b and 46b, formed in the other end of container 40.

In addition, inclined side doors D3 and D4 are formed in the sides of container 40. Door D3 is bounded by short groove segments 60a, 60b and groove 46. Door D4 is bounded by short groove segments 62a, 62b and groove 44.

Substrate 40 is of substantially uniform thickness, except for segments which are of reduced thickness to form integral hinges for the doors. Reduced thickness segments 64 and 66 form hinges for the horizontal door portions 56a and 58a, while sediments 68 and 70 form hinges for door extensions 56b and 58b. Similarly, reduced thickness segments 72 and 74 form hinges for doors D3 and D4.

The hinge segments 68, 70, 72 and 74 thus connect the doors to a peripheral base 76 comprises segments 76a, 76b, 76c and 76d that are separated by slots 77a, 77b, 77c and 77d. This segmentation provides flexibility which facilitates insertion of air bag 34 and inflator 36 within container 30.

The base includes spaced mounting flanges 78a, 78b, 78c and 78d (see FIGS. 8 and 9) for mounting inflator 36 to container 30 for mounting the resulting assembly to mounting flanges (not shown) on hub 20.

The method of applying urethane foam covering 42 to substrate 40 to form the unitary container 30 will now be explained, with reference to FIGS. 4–9. A mold 80 comprises a body 82 having a cavity 84 and a removable cover 86. Cavity 84 is configured as the negative image of the finished exterior surface of covering 42 of container 30, as shown in FIGS. 6 and 9.

As shown in FIG. 4, a removable lifter core 88 is secured to lid 86 and has a central bore that is threaded at 90. Lifter core 88 includes a plurality of blades corresponding to each of the slots in substrate 40. The blades are designated by the reference number of their corresponding slots increased by 100. Thus, blade 144 extends through slot 44 and blade 160a extends through slot 60a, as shown in FIG. 5.

As shown in FIG. 4, lifter core bore 90 is threadedly engaged by an adjustment screw 92. Adjustment screw 92 has a shaft 94 that extends through cover 86 and mounts locating clips 95 and 96 which lock shaft 94 against axial movement. A thumbwheel 98 is mounted to the outer end of shaft 94 and is rotatable to move lifter core 88 to clamp substrate 40 to cover 86.

Figure 7:
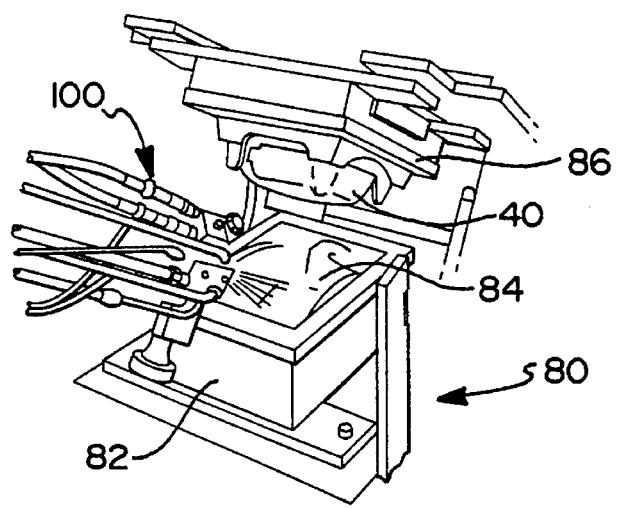

Referring now to FIG. 6, after a mold release is sprayed into mold cavity 84, substrate 40 is inserted onto lifter core 88 by spreading base segments 76a, 76b, 76c and 76d. Thumbwheel 98 is rotated to move lifter core 88 upwardly, clamping substrate flanges 78a, 78b, 78c and 78d to mold lid 86. Next, a predetermined amount of mixed urethane is poured from a dispenser 100 into the open cavity 84, as indicated in FIG. 7.

Figure 8:
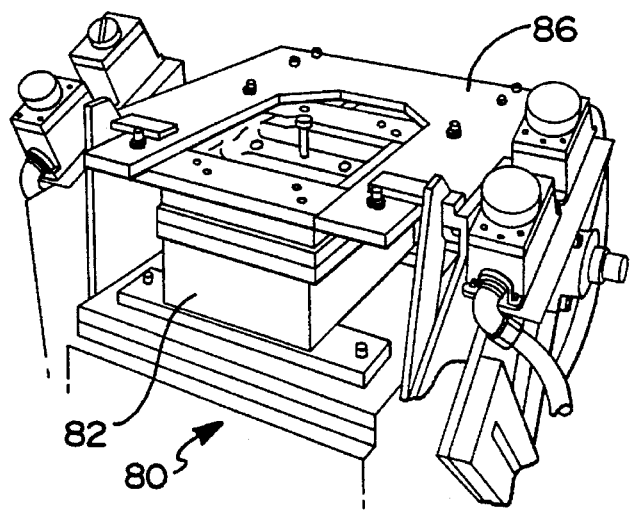
Figure 9:
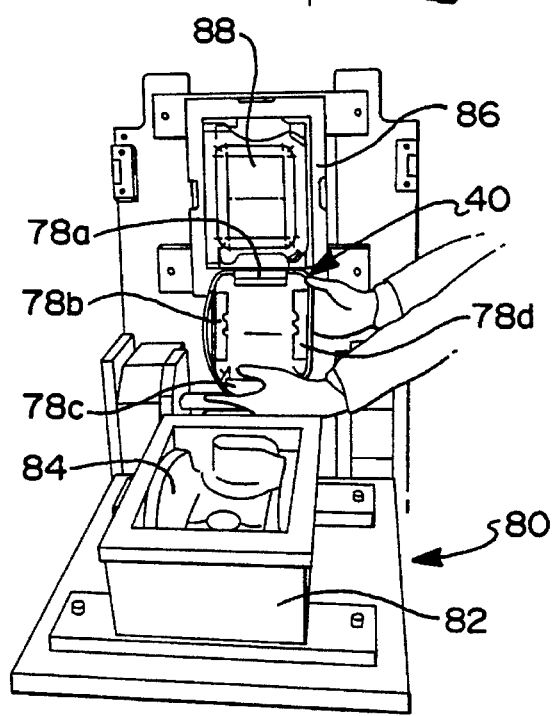

The mold lid is then closed, as shown in FIG. 8 and the urethane foams to fill the void between the outer surface of substrate 40 and the wall of mold cavity 84. Container 30 is cured for a predetermined time dependent on final thickness of the covering 42. This forms a skin on the outside of cover 42 and adheres the cover to substrate 40 to form a unitary container 30.

The blades of lifter core 88 produce reduced sections of foam covering to produce tear lines on the underside of cover 42. These tear lines outline and define the doors D1, D2, D3 and D4, while leaving connecting tabs 48a, 48b, 52a, 52b, 54a and 54b intact. Blades 177a, 177b, 177c and 177d extend completely through the slots into engagement with the face of cavity 84. This preserves the independence of base segments 76a, 76b, 76c and 76d, which enables the completed container to be removed from lifter core 88, as shown in FIG. 9, after thumbwheel 98 is loosened.

Upon removal from mold 80, cover layer 42 is trimmed and container 30 ready for installation in a vehicle, as shown in FIGS. 1 and 2. Container flanges 78a, 78b, 78c and 78d are secured to inflator mounting ring 102, to which air bag peripheral hem 104 is clamped by a mounting ring 106. This assembly is then bolted to substructure 108 of steering wheel base 22.

Upon ignition of inflator 36, pressure gas will begin inflating air bag 34. The force exerted by inflating bag 34 will tear foam cover 42 along the tear lines and tear tabs 48a and 48b to open horizontal door portions 56a and 58a. The air bags will then deploy outwardly of container 30. Further air bag inflation will further tear cover 42 along the tear lines flanking inclined door segments 56b and 58b and doors D3 and D4. This will also tear tabs 52a, 52b, 54a and 54b, fully opening all doors.

The force required to rupture container 30 to enable air bag deployment; can be varied by varying the size of substrate tabs 48a, 48b, 52a, 52b, 54a and 54b. The strength of the tear lines is determined by the thickness of the foam layer separating corresponding grooves 43 and 44, 45 and 46, and 47 and 48. This thickness can be varied by varying the height of the lifter core blades.

It has been found that foam adherence to the substrate is enhanced by the application of a primer to the exterior of the substrate prior to foam injection. One such primer is a sealer comprising a very dilute solution of acidic polymer, known as SECUR-TITE, manufactured by DuBois Chemicals, Inc., Cincinnati, Ohio. The urethane foam covering is preferably a self-skinning urethane foam, formed of aliphatic or aromatic isocyanate polyurethane, having a durometer of 35–60 Shore A. Preferably, paint is applied to the mold prior to introduction of the urethane, although paint may be applied after molding is complete.

This invention provides a unitary air bag container which thereby facilitates installation. It has a urethane foam outer covering which can easily match the steering wheel in feel and color. It is formed by a process that produces a finished container having a substrate which provides structural integrity and forms doors that open easily to facilitate air bag deployment. It eliminates the floating mesh manufacturing problem which requires a complex molding operation to wed the substrate, the urethane and the mesh.

Although only a preferred embodiment of this invention has been illustrated and described, obvious modifications thereof are contemplated within the scope of this invention and the following claims.

We claim:

1. A method of manufacturing a unitary container, having a structural substrate with a foam covering, for an air bag comprising the steps of a. providing a molded plastic structural substrate having a slot defining a door, b. providing a mold having a mold body, a mold cover and a core mounted on the mold cover, the core having a plurality of upstanding spaced blades, c. placing the structural substrate over the core prior to closing the mold cover with the upstanding spaced blades projecting out through the slot of the structural substrate such that the upstanding blades project out beyond the structural substrate and into spaced relation to the mold body when the mold cover is closed, d. injecting a urethane foam into the mold body such that the urethane foam is located between the structural substrate and the mold body when the mold cover is closed, e. closing the mold cover and simultaneously positioning the structural substrate and the upstanding blades in spaced apart relation to the mold body with the upstanding blades extending partially into the urethane foam for producing a notched tear line on the urethane foam when the foam is cured and f. curing the foam after closing the mold cover to form a foam cover integral with the structural substrate and the foam cover having a notched tear line along said slot.

2. The method of claim 1, wherein the substrate and mold body are sufficiently spaced to enable foaming of the urethane.

3. The method of claim 1, wherein the substrate is coated with a dilute solution of acidic polymer prior to closing the mold cover to enhance adherence of the foam cover to the structural substrate.

* * * * *